Dec. 17, 1968  D. L. PETERSON  3,416,496
FARROWING STRUCTURE
Filed Oct. 10, 1966  2 Sheets-Sheet 2
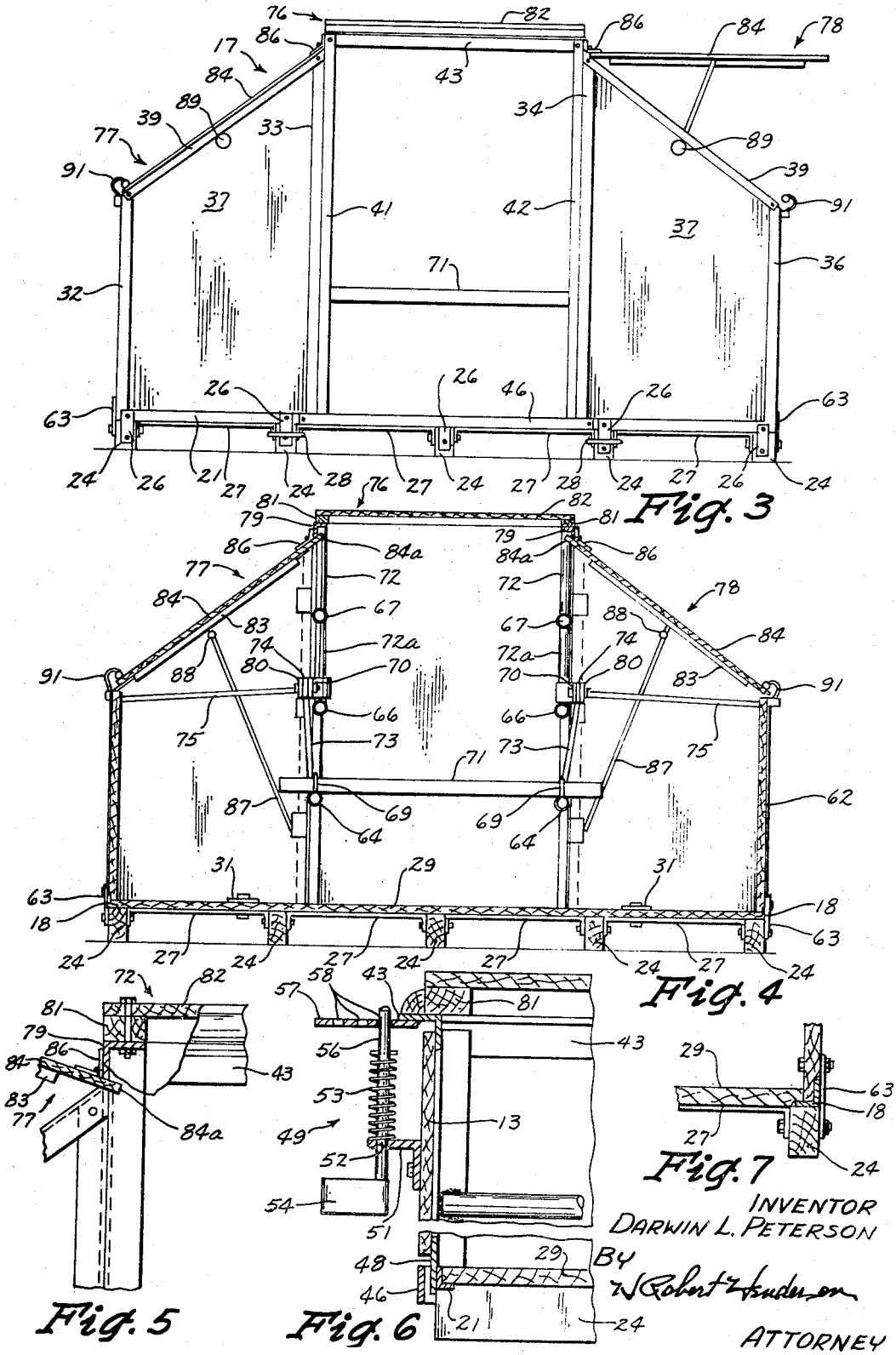
INVENTOR
DARWIN L. PETERSON
BY
N. Robert Henderson
ATTORNEY

United States Patent Office 3,416,496
Patented Dec. 17, 1968

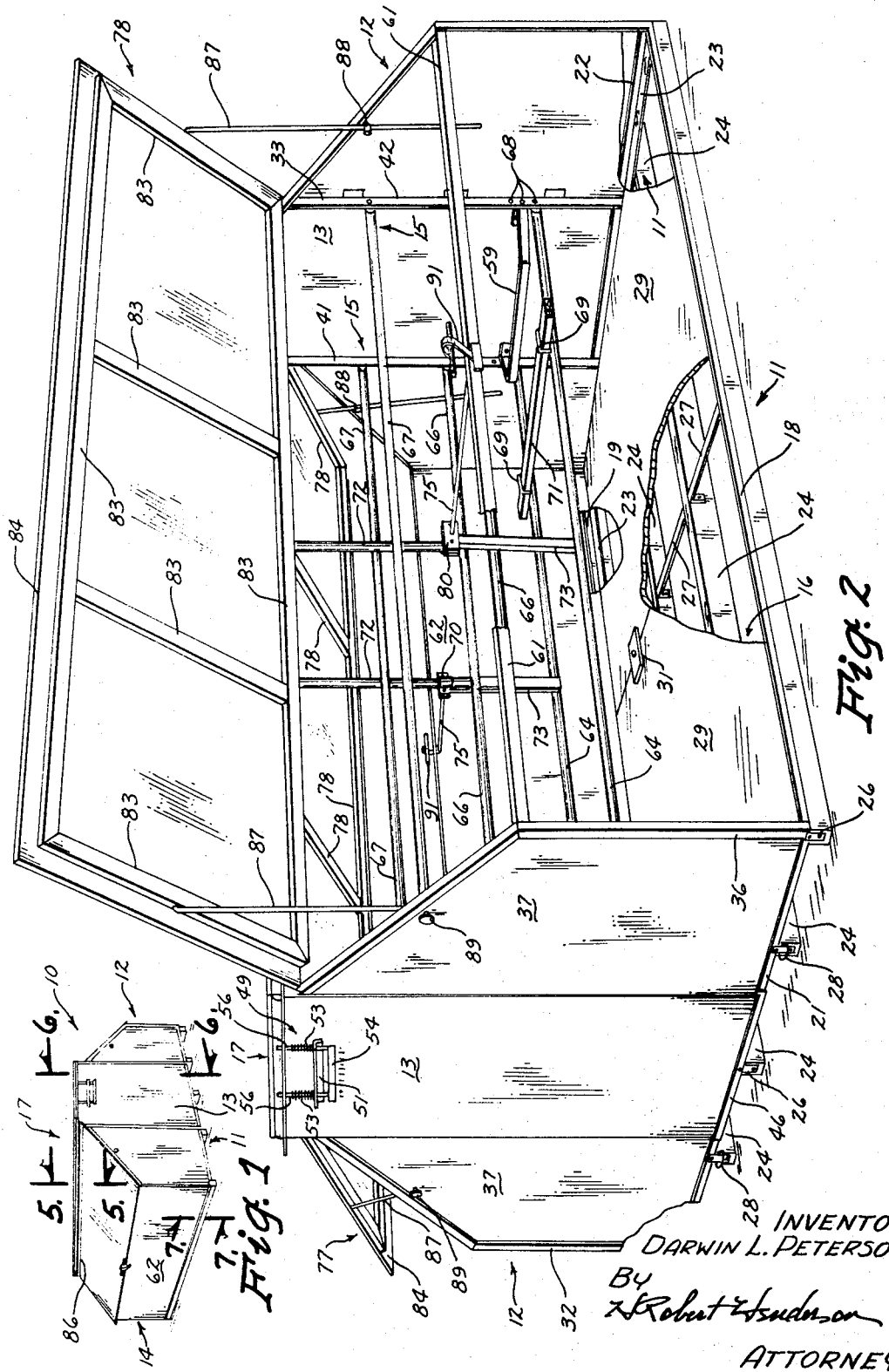

3,416,496
FARROWING STRUCTURE
Darwin L. Peterson, Williams, Iowa 50271
Filed Oct. 10, 1966, Ser. No. 585,507
5 Claims. (Cl. 119—16)

ABSTRACT OF THE DISCLOSURE

This invention pertains to a farrowing structure for swine, and wherein maximum aeration is provided by a box-like framework having removable side panels slidably mounted in side frames, hinged, sloping roof panels extended between a flat roof section and the side frames, door panels which are also openable and closable by pivoting same at their base connections with the framework, and including internal, open partition means for forming a stall interior the framework.

In the farrowing and raising of pigs, major consideration must be given to the control and elimination of disease, such as rhinitis, pneumonia, and scours, all of which retard the growth pattern of pigs. Sanitation can be provided by utilizing a structure, adapted to confine the sow and her litter, which can be easily cleaned and disinfected, and also provides access to the inhibitants without actual entrance by the operator or veterinary.

If a sow farrows in the field or in a structure wherein she has complete freedom, the operator, veterinary or neighbor must enter the enclosure to reach the sow or litter for such purposes as injections, castration or any of the daily needs that present themselves. This entrance not only creates a hazard for such person but also increases the possibility of introducing and transmitting disease.

Weather conditions must also be considered in confining a sow and her litter to an enclosure. Animals will gain more weight from a given quantity of feed if extreme temperature conditions can be avoided. Therefore aeration of the structure, will aid in preventing a build up of heat within the structure. Also during the winter months the ability to readily close all openings will tend to allow a buildup of heat radiation from the occupants. Often times during extreme cold temperatures supplement heat can be added in the form of heating elements therefore it is necessary to protect the animals from the heating unit and the heating unit from the animals.

Another problem inherent in the farrowing of pigs is the loss of pigs due to crushing. In a structure where the sow is allowed complete freedom she often steps on or lies on the pigs which either kills or deforms them, thus reducing the potential profit which should be realized when the litter is marketed.

It is therefore an object of this invention to provide a farrowing structure which is easily cleaned thus preventing disease to be transmitted to a later litter and allowing a continuous use of the structure.

Another object of the invention is to provide a farrowing structure having a removable floor, doors and side panels thus allowing the floor, doors and panels to be removed after each litter vacates the structure for cleaning and disinfecting.

A further object of this invention is to provide a farrowing structure having a pair of roof wings which are adjustable to a plurality of positions for allowing sunlight to enter the structure, for controlling ventilation of the structure, and to permit an operator or veterinary to work with the sow and pigs without entering the structure. A supplemental object is to provide roof wings which prevent rain from entering the interior of the structure.

A still further object of this invention is the provision of a farrowing structure having a door movably mounted in each end of the structure which can be opened to any number of positions thus allowing a control over the amount of airflow therethrough.

Another object of this invention is the provision of a farrowing structure having a protective device mounted therein for holding a heating element which device prevents the animals contained within the structure from contacting the heating element, thus either causing injury to the animals or damage to the element.

Yet another object of the invention is the provision of a farrowing structure wherein the area in which the sow is contained can be limited.

Still another object of this invention is the provision of a farrowing structure having side openings the height of which is adjustable, preventing the sow from turning around and simultaneously aiding the litter in its nursing maneuverability.

Yet a further object of this invention is the provision of a a farrowing structure which is skid mounted thus providing a unit which can be easily moved to different locations.

Another object of this invention is to provide a farrowing structure wherein an improved structure is provided, a structure that combines ruggedness with simplicity and with ease of assembly and disassembly.

A further object of this invention is the provision of a farrowing structure capable of attaining the above designated objects, which is economical to manufacture, simple and rugged in structure, and effective in operation.

These objects, and other features and advantages of this invention will become more readily apparent upon reference to the following description, when taken in conjunction with the accompanying drawings, wherein:

FIG. 1 is a perspective view of the farrowing structure;

FIG. 2 is an enlarged perspective view of the structure with the wings in open positions and with a side panel removed;

FIG. 3 is an end elevational view with one wing in an open position and with a door removed;

FIG. 4 is a vertical, transverse section;

FIG. 5 is a greatly enlarged, fragmentary sectional view taken along the line 5—5 in FIG. 1;

FIG. 6 is a greatly enlarged, fragmentary sectional view taken along the line 6—6 in FIG. 1; and FIG. 7 is an enlarged fragmentary sectional view taken along the line 7—7 in FIG. 6.

Referring now to the drawings, the farrowing structure of this invention is indicated generally at 10 in FIG. 1. Generally the structure 10 comprises a horizontally disposed floor frame 11 (FIG. 2); vertically disposed end walls 12 mounted at each end of the floor frame 11, each having a door 13 removably mounted therein; vertically disposed side walls 14 (FIG. 1) extended between and secured to the end walls 12; a pair of transversely spaced interior partition units 15 (FIG. 2) secured to end extended between the end walls 12; a floor member 16 removably mounted on the floor frame 11; and a roof unit 17 mounted on and extended between the end walls 12.

More specifically, the floor frame 11 comprises a quartet of elongated frame angles 18, 19, 21, and 22 (FIG. 2), two of which form the side frames 18 and 19 and two of which form the end frames 21 and 22. Each of the side frames 18 and 19 are connected, as by bolts, at their ends to the end frames 21 and 22 to form a rectangular frame work with the angles disposed to form an inwardly extending shelf 23 around the floor frame 11. Attached to and extending between the end frames 21 and 22 and depending therefrom are a plurality of parallel skid members 24 (FIGS. 2 and 4), the two outermost of which are also secured to and depend from the side frames 18 and 19. The skid members 24 are also securely attached on both ends of the end frames 21 and 22 by a plurality of brackets 26 (FIG. 3) each of which is bolted to one of the end frames and the end of one of the skid members. A plurality of braces 27 (FIGS. 2 and 4) are provided with one secured to and extended between each adjacent pair of skid members, as shown in FIG. 2. A pair of two rings 28 are attached, each to one end of a skid member 24 as best noted in FIGS. 2 and 3.

Removably mounted on the shelf 23, the skid members 24, and the braces 27 is the floor member 16 (FIG. 2) comprising a pair of panels 29. Each floor panel 29 covers one-half the floor area, with one edge thereof mating with one edge of the other panel in end-to-end relation at the longitudinal center of the structure and over the braces 27. The panels 29 are removably secured to the floor frame, at the two outermost braces 27, by a pair of straps 31 (FIGS 2 and 4) extending over the panels 29 and bolted to the brace 27.

Each of the end walls 13 are identical, therefore only one will be described with like reference numerals indicating like parts. Each end wall 13 includes a quartet of parallel upright angle posts 32, 33, 34 and 36 (FIG. 3). The outermost posts 32 and 36 are mounted at the corners of the floor frame while the center two posts 33 and 34, of substantially greater length than the corner posts, are mounted on the end frame and separate the end wall into three sections. Each corner post 32 and 36 is interconnected at the upper end thereof to the upper end of the adjacent center post 33 or 34 by an angularly disposed beam 39. An end panel 37 is mounted in each outer section of the end wall, with one panel secured to the posts 32 and 33, the beam 39 and the end frame 21, and the other panel secured to the posts 34 and 36, the beam 39 and the end frame 21. Mounted to the end frame and disposed in the center section and abutting and secured to the center posts are a pair of girders 41 and 42 which are interconnected at their top ends by a header 43. The girders 41 and 42 are inset relative to the center posts and act as a door stop and a part of the interior partition walls 15, to be described hereinafter. A bar 46 is secured at both ends thereof to the outer surface of the center section of each of the end frames 21 and 22, with the part thereof intermediate the ends spaced outwardly from the end frame, as best shown in FIG. 6.

Disposed in the center section of each end wall 12 between the center posts 32 and 33 and against the girders 41 and 42 is the door 13 (FIG. 2). Mounted across the bottom of each door to the inner surface thereof is a slat 48 (FIG. 6) which depends below the bottom edge of the door 13. The slat 48 is adapted to slide between the end frame 21 and the bar 46, thus allowing the door 13 to pivot on its bottom edge.

Secured to the outer surface near the top edge of each door 13 is a holding unit 49 (FIG. 6). Each holding unit 49, as best shown in FIGS. 2 and 6, comprises a horizontally disposed angle element 51 secured to the door 13, having a pair of spaced apart apertures 52 formed therein; a pair of coil springs 53 mounted on the angle element 51, wherein the passages therethrough are in alignment with the apertures 52; and a handle member 54 having a pair of upstanding spaced apart rods 56 secured thereto adapted to extend through the apertures 52 and through the passages of the springs 53. The outer surface of each rod 56, near the upper end thereof, is attached, as by welding, to the top of the spring 53. The springs 53 bias the rods 56 and handle member 54 in a normal position wherein the top of each rod extends beyond the upper edge of the door 13.

A horizontally disposed bar 57 (FIG. 6) is attached to each of the headers 43 and extends outwardly therefrom. Two parallel rows of slots 58 are formed in each bar 57, with the plane through each row disposed in perpendicular relation to the longitudinal axis of each bar and in alignment with one of the rods 54.

With the rods 54 (FIG. 6) inserted in the pair of slots 58 disposed closest to the header 43 the door 13 is held in a closed position against the girders 42 and 42 and the header 43. By grasping the handle member and pulling down thereupon the rods 54 can be withdrawn from the slots 58 and the top of the door can be swung outwardly and upwardly for removal of the door 13 from the end wall. The door can also be swung outwardly to a second position with the rods reinserted in a different pair of solts 58, thus holding the door in an open position, with the amount of opening being dependent upon which pair of slots 58 the rods are inserted into. A horizontally disposed U-shaped member 59 is bolted to the door 13, on the right side of FIG. 2 as viewed for example, always to the rear of the sow. The member 59 is at a height above the floor appropriate to be engaged by either or both rear legs of the sow, thus preventing her bumping and bending or breaking that door 13. Furthermore, should a pig get between her and the rear door 13, she could not crush it.

The side walls 14 (FIGS. 1 and 2) are identical, therefore like reference numerals are used to designate like parts. Each side wall 14 comprises a horizontally disposed side beam 61 secured to and extended between the upper ends of the corner posts 32 and 36 on opposite end walls. The side beam 61 in conjunction with the corner posts 36 and 32 and the side frame 18 form a rectangular framework for the side wall 14. Removably mounted in the sidewall framework is a vertically disposed side panel 62. Each side panel 62 has an elongated member 63 (FIG. 7) mounted across the bottom of the outer surface thereof, that extends outwardly from the outer surface and depends below the botom edge of the side panel 62. On mounting the side panel in the sidewall framework, the upper edge of the side frame 18 extends between the outer surface of the bottom of the side panel 62 and the inner surface of the member 63, thus substantially preventing lateral movement of the side panel 62.

Each of the interior partition units 15 are identical, therefore only one will be described with like reference numerals indicating like parts. Each partition comprises a trio of spaced apart horizontally disposed tubular rods 64, 66 and 67 (FIGS. 2 and 4). The rods are secured at their ends to and extended between the girders 41 and 42 mounted on opposite end walls 12. A plurality of spaced apart holes 68 are provided in each of the girders 41 and 42, as best noted in FIG. 2, thus allowing the bottom rod 64 to be adjustably mounted at any of a plurality of different heights above the floor panels 29.

The adjustability of the bottom rods 46 provides their proper positioning so as to prevent the sow from turning around. Additionally, they can be removed to provide further use of the structure to grow a litter to possibly seventy-five pounds per pig. Their vertical adjustment also aids in enabling the pigs to nurse while preventing the sow from sliding out. Each of the bottom rods 46 has a U-clamp 69 secured thereto, with each clamp 69 disposed opposite each other in a plane parallel to the end frames 12.

Removably mounted in and extended between the clamps 69 is a bar 71 which is spaced about two feet from the rear door 13 so that a heating device (not shown), such as a light bulb or the like can be placed in a protected position adjacent the door 13.

The upper two rods 66 and 67 of each partition 15 (FIG. 2) are rigidly supported at their longitudinal centers by a pair of first braces 72 mounted as illustrated. The upper end of the upper brace 72 is secured to the roof unit 17. A second depending brace 73, in axial alignment with the lower one of the first braces 72, is slideably mounted on that first brace 72 by a clamp 74 bolted to a spacer 70 slidable on the lower brace 72. The lower rod 64 is secured to the bottom end of the second brace 73. A third brace 75 (FIG. 2) is secured, via a plate 80, to and extends between the first brace 72 and the side beam 61, thus rigidly supporting the interior partition 15 in a vertical position.

The roof unit 17 comprises three sections, a center section 76 (FIGS. 3 and 5) and two wing sections 77 and 78. The center section 76, mounted on and extends between the headers 43, comprises a pair of spaced apart angle beams 79 secured to and extended between the headers 43, a rectangular roof frame 81 (FIGS. 5 and 6) mounted on the headers 43 and angle beams 79, and a center roof panel 82 mounted on the frame 81.

As each of the wing sections 77 and 79 are identical, only one will be described with like reference numerals referring to like parts. Each wing section 77 or 78 comprises a rectangular wing frame 83, as best noted in FIG. 2, on which is mounted a panel 84. The panel is disposed on and extends between the end walls 12 when in a closed position, with the wing frame 83 disposed between the end walls 12. The panel 84 is removably and hangedly secured by a plurality of hinges 86, only one being shown in FIG. 5, to the angle beams 79 of the center section. A pair of depending rods 87 (FIG. 2) are pivotally mounted on opposite ends of the wing frame 83. A C-clamp 88 is slidably secured on each rod and secured by a tightening bolt 89 at its split end to the end panel 37.

Upon loosening the bolt 89 the rod 87 is adapted to slide through the C-clamp thus permitting the wing section 78 to be pivoted about its hinges 86 and to be locked in any open position by merely tightening the bolt 89. A latching device 91 (FIG. 2) is secured to each side beam 61, intermediate the ends thereof for locking each wing section 77 and 78 in a closed position. It will be noted, referring to FIGS. 4 and 5, that the inner edge 84a of the panel 84 extends inwardly beyond the roof sill 79. Thus, at any time a wing section is disposed below the horizontal, rain water is prevented from entering the interior of the structure.

Assembly of the farrowing structure is relatively simple and requires no particular skill. The floor frame 11, end walls 12, side walls 14, partition walls are all assembled together by bolts. The structure can either be mounted with or without the skid member 24 and floor panels 29.

In use as a farrowing structure the bottom rod 64 (FIG. 2) of each partition can be positioned to maintain the sow in the interior stall. To limit the area of the inner stall the bumper 59 is provided.

To supply four-way ventilation both wing sections 77 and 78 can be positioned in any of a plurality of arcuately spaced positions relative to the center section 76, and both of the doors 13 can be locked in any of a plurality of open positions. The door in an open position is securely seated on the bottom between the end frame 21 or 22 and the bar 44 and locked by the holding unit 49 to the bar 57, thus preventing the escape from or entrance to the interior of the structure.

The wing sections also allow complete access without entrance of the operator or veterinary thus providing means to the sow and litter's needs from birth to weaning. After weaning, the lower rods 64 (FIG. 2) can be removed by loosening or removing the bolts holding the rods to the girders and the bolts on the clamps 74, thus providing a structure which can be used for housing the litter for further growth.

In cold weather conditions, the bar 71 is slid into place, and a heating element (not shown) mounted between the bar 71 (FIG. 2) and the rear door 13, the bar 71 protecting the heating unit from damage and the animals from injury due to contact therewith. Being quite portable, the structure can also be moved inside a larger enclosure during extreme temperature conditions.

The structure is easily cleaned and disinfected by removing the side panels 62 and the floor panels 29. Of importance is the fact that the floor panels 29 can easily be reversed and re-installed by the operator, allowing each side thereof sufficient time to become disease free. Tests have indicated that by the application of an epoxy to both sides of the panels 29, the opportunity for disease is lessened. If immediate reuse is desired before adequate cleaning and disinfecting can be accomplished, spare panels may be installed.

Many times it is desirable to move the structure to different fields or locations. Relocation is readily accomplished by hooking a cable to tow rings 28 (FIG. 2) and skidding the structure on its skid members 24.

Although a preferred embodiment of this invention has been described and disclosed hereinbefore, it is to be remembered that various modifications and alternate constructions can be made thereto without departing from the true spirit and scope of the invention as defined in the appended claims.

I claim:

1. A farrowing structure comprising:
   a horizontally disposed floor frame;
   vertically disposed end frames mounted at each end of said floor frame;
   vertically disposed side frames extended between and secured to said end frames;
   interior open partition means secured to and extended between said end frames and forming an interior stall;
   a reversible floor unit removably resting on said floor frame;
   a pair of end panels secured to each of said end frames;
   a side panel slidably removably mounted on each of said side frames;
   an openable and closeable door panel mounted on each of said end frames intermediate said end panels; and
   roof means mounted on said end frames.

2. A farrowing structure as defined in claim 1, and further wherein said roof means includes a center roof section secured to and extended between said end frames over said interior stall, and a pair of wing panels each hingedly mounted opposite each other on said center section, each of said wing panels movable from a closed position disposed on and extended between said end frames to an open position disposed over said structure.

3. A farrowing structure as defined in claim 2, and further wherein each wing panel has an inner edge spaced inwardly and below said center roof section at all positions of said wing panels.

4. A farrowing structure as defined in claim 1, and further wherein each of said door panels has a holding means mounted thereon and each end of said center section has a locking unit secured thereto, said holding means movable from a first position adapted to interact with said locking unit for holding said door in a closed position to a second position wherein said door is removable from said end frame, and further movable to a third position adapted to interact with said locking unit for holding said door in a plurality of open positions.

5. A farrowing structure as defined in claim 1, and further wherein said interior partition means comprises a pair of transversely spaced, substantially vertically disposed partition units, each of said partition units comprising a plurality of substantially horizontally disposed parallel rods, the lowermost of which is vertically adjustably movable to one of a plurality of positions.

References Cited

UNITED STATES PATENTS

| | | | |
|---|---|---|---|
| 1,361,660 | 12/1920 | Adix et al. | 119—20 |
| 1,439,157 | 12/1922 | Ford | 119—16 |
| 2,602,419 | 7/1952 | Johnson | 119—16 |
| 2,712,677 | 7/1955 | Hyde | 119—16 X |
| 3,125,988 | 3/1964 | King | 119—20 |

HUGH R. CHAMBLEE, *Primary Examiner.*

U.S. Cl. X.R.

119—20